3,080,300
FLASH VAPORIZATION APPARATUS
Reading Barlow Smith, Harvey, Ill., assignor, by mesne assignments, to Sinclair Research, Inc., New York, N.Y., a corporation of Delaware
Filed Oct. 16, 1957, Ser. No. 690,563
2 Claims. (Cl. 196—114)

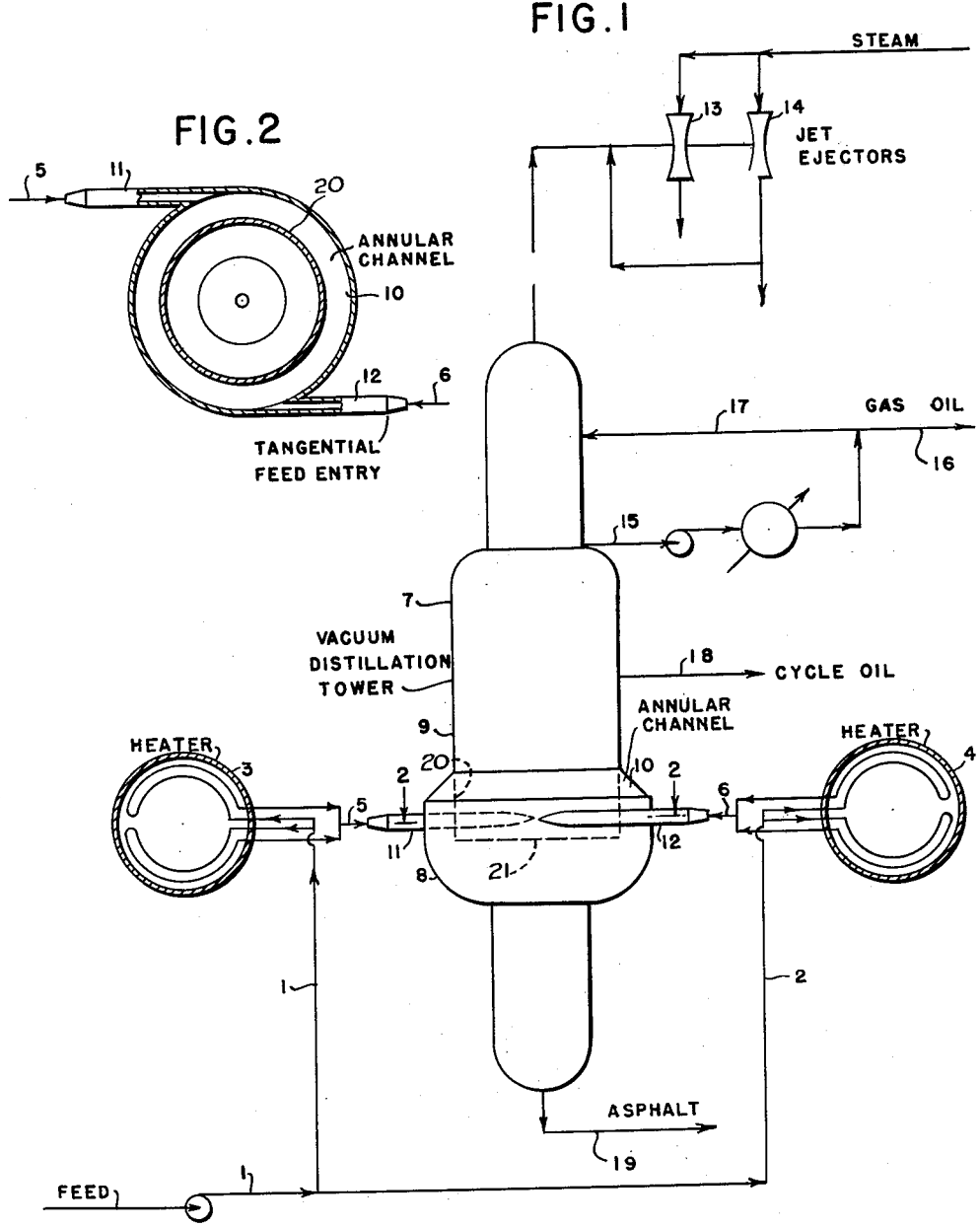

My invention relates to the separation of materials of varying volatility by flash vaporization and in particular relates to a novel apparatus for this purpose which provides greatly improved vapor-liquid separation efficiency.

The separation of materials of varying volatility by flash vaporization is a major industrial process operation. A common use of this process is the vacuum flashing of petroleum reduced crudes to separate asphalt from the gas oil, the latter being used as catalytic cracking feed stock. Flash vaporization is also widely used in other industries such as the purification of crude glycerine or fatty acids. Conventional flash vaporization towers are shown in Nelson, Petroleum Refinery Engineering, 3rd edition, McGraw-Hill, New York, N.Y., 1949, pages 215 and 230, and in United States Patent 2,740,753 to A. Schmalenbach. The conventional flash vaporization vessel used to separate a feed of varying volatility consists of a uniform diameter cylindrical vessel into which a preheated feed is introduced, usually a short distance below the center of the vessel. Conventional feed entries are of the radial type or the tangential type in which the feed is introduced into an annular channel in the tower. Partial vaporization may occur in the preheater and transfer line to the vaporization vessel. Bottoms are withdrawn from the bottom of the vessel and the overhead product is removed through a condenser where the condensed product is separated from the fixed gases. The fixed gases are removed through ejectors to maintain the vacuum in the system. The area of the vessel above the feed introduction point is a disengaging space to allow the vapors to smooth their flow paths and thus allow gravitational settling of entrained liquid particles. One of the major problems in flash vaporization is the mechanical separation of the vapor from its entrained non-volatile liquid. This is especially important in vacuum flashing where high velocities are encountered and the entrainment problem is severe.

My invention provides a novel flash vaporization tower characterized by a tangential feed entry into a tower section of reduced cross-sectional area having a height of at least one half of its diameter. The flash vaporization tower of my invention comprises a cylindrical vertical metal shell of varying diameter containing an internal annular channel whose inner diameter is substantially equal to the diameter of the tower section immediately above the annular channel. The tower section above the annular channel is of a diameter less than the diameter of the section containing the channel and is of a height above the lip of the channel equal to at least one half of the section diameter. Feed stock is introduced tangentially into the annular channel and flows smoothly around the tower and under the lip of the annular channel up into the upper section of the tower. As the upper tower section diameter is substantially equal to the inner diameter of the annular channel eddy currents are negligible and the complete tower area is advantageously utilized. Adequate disengaging space for the vapor-liquid phase is provided by the minimum height required for the upper tower section.

My invention corrects some major disadvantages of the conventional type of tangential feed entry and thereby greatly improves the efficiency of the mechanical vapor-liquid separation. Improved vapor flow paths are obtained by my invention and therefore a reduction in mechanical entrainment is possible in excess of proportionally increasing the tower diameter with a conventional type of tangential feed entry. In addition, the diameter of the upper portion of the flash tower advantageously can be made substantially smaller than an equivalent conventional flash tower and yet give improved operation for a given capacity.

The novel features of my invention and the significant improvement in vapor-liquid separation efficiency and hence reduction in entrainment which can be obtained by the use of my invention will best be shown by describing the design problems involved in vapor-liquid separation in flash vaporization towers and the conventional types of feed entries used.

Calculations show that the mixed phase velocity in a transfer line leading to a vacuum flash tower may be as high as 200 to 1000 feet per second. Under these conditions, further calculations, supported by experimental data on high velocity flow in pipes (Hunsaker, J. C. and Rightmire, B. G., Engineering Applications of Fluid Mechanics, page 177, McGraw-Hill, New York, N.Y., 1947) show that sonic velocity may be reached at the exit of the transfer line. The high velocities and extreme turbulence in the transfer line promote the formation of a disperse vapor-liquid phase whereby the liquid is broken up into fine droplets. When the mixed vapor-liquid phase enters the flash tower, the sudden expansion in flow area causes an explosion as the velocity drops from some 200 to 1000 feet per second to approximately 5 to 20 feet per second, depending upon the tower vacuum and area. The sudden turbulence at the flash area further disperses the liquid particles in a manner analogous to atomization. The efficiency of the vapor-liquid separation may be severely impaired due to excessive entrainment of the fine liquid droplets.

Normally, the required size of a flash vaporization tower is determined by correlation with the settling velocity of the entrained liquid droplets in a gravitational field. When the frictional resistance of the average sized liquid droplet in falling through the gaseous medium is equal to the residual gravity force, then the liquid droplet will reach a constant settling velocity. If the superficial vapor velocity of the vapors based on the free cross section area of the flash tower does not exceed the settling velocity of the liquid droplets, then the amount of entrainment or carry-over can be controlled.

From analogy with Stokes law of settling the velocity of gravitational settling can be expressed as $$V = \sqrt{\frac{D(P_1 - Pg)}{0.01164 Pg}} \quad (1)$$

where:
$V$ = velocity of settling particle, commonly called allowable velocity.
$P_1$ = density of liquid droplets at tower conditions.
$Pg$ = density of vapor at tower conditions.
$D$ = a measure of the size distribution of dorplets to be separated.

Equation 1 is commonly written for design purposes as $$V = C \sqrt{\frac{P_1 - Pg}{Pg}} \quad (2)$$

where the "C" factor is an experimentally determined factor which can be applied to the design of the flash vessel. Theoretically, "C" is a function of the average liquid droplet diameter and droplet size distribution. The value of "C" has a unique value for each type of flash vaporization process. For example, the "C" factor requirements for the flash vaporization of a petroleum reduced crude may be different from the "C" factor for a fatty acid purification. The amount of entrainment which can be tolerated in the overhead product also varies with the specification requirements for the product.

Another serious factor which enters into the design of flash towers is the so-called disengaging height above the flash section. Separation of the vapor and liquid at the flash section creates eddy currents and toroidal velocity acceleration of the vapor which hinder settling. As the vapors rise up the tower the velocity vectors are smoother and the local accelerations diminished thus allowing entrainment to settle at the gravitational rate.

A common type of feed entry for a flash vaporization tower is one in which the feed enters radially. There are, however, several undesirable features of the radial feed entry. The severe turbulence created at the flash section produces eddies which interfere with entrainment settling. The maximum amount of entrainment settling which can take place is limited to normal gravitational rates. For the flash vaporization of petroleum reduced crudes normal gravitational settling is not sufficient to obtain the low color and low carbon residue content of the gas oil required of good catalytic cracking feed stock. It is therefore necessary to use the tangential separating principle to reduce entrainment above and beyond the separation obtainable from gravitational settling.

To overcome some of the difficulties encountered by the radial feed entry a tangential feed entry is often used which delivers the mixed phase feed tangentially to an annular channel, open at the bottom and closed at the top, built around the inside of the tower. The conventional tower is of uniform diameter and the annular channel is built around the inside of the tower so that the feed stock on leaving the annular channel flows upwards into a tower area of a larger diameter than the inner diameter of the channel. This type of entry has two major advantages over the radial entry in reducing entrainment. First, the separation of the vapor and liquid feed as it enters the tower from the transfer line is less abrupt and hence the formation of more disperse liquid droplets is reduced. In addition, since the separation is directed downwardly and tangentially, the vapor flow in the upper part of the tower is smoother. Second, as the separating velocity due to a centrifugal field is directly proportional to the square of the vapor velocity and inversely proportional to the radius of curvature of the gas stream, much of the dispersed liquid droplets will be coalesced and deposited on the tower shell as a liquid.

Although the conventional tangential entry provides improved vapor-liquid separation efficiency there are major disadvantages associated with its use. First, the actual vapor-liquid separation efficiency is not actually in proportion to the increased gravitational force at the periphery of the tangential entry. The main reason for the reduction in the theoretical separation efficiency is that some of the separated liquid is re-entrained by eddy currents which form below the tangential entry. This is a characteristic of all centrifugal separation and can be controlled to some extent by proper sizing of the annular channel. Too great a downward velocity will also cause a remixing of the vapor and liquid. Hence gravitational settling above the tangential entry is important. Moreover, with the conventional internal tangential entry the flow characteristics of the vapors as they flow through the annular channel opening and into the upper part of the tower, which is larger in diameter than the inner diameter of the channel, are disturbed by eddy currents formed after they pass through the channel. The conditions of flow accompanying the sudden increase in flow area are analogous to those beyond the throat of an orifice or through a sudden enlargement. Turbulence is created by impact of the higher velocity stream at the channel into the slower moving fluid downstream. Eddy currents formed beyond the restriction or sudden enlargement in area form local velocity acceleration which interfere with attainment of smooth vapor flow. Hence gravitational settling of entrainment is interfered with. Since the disengaging space above the tangential channel is frequently less than a diameter, it is evident that these eddies occur all the way up the tower. One of the features of this invention is that it does away with the sudden enlargement of flow area thereby removing a major source of eddies and turbulence which interfere with entrainment separation.

Further, the allowable vapor velocity in a flash tower is set by the size of the inner diameter of the annular channel since this is the velocity which prevails throughout the tower. Therefore, to allow for proper gravitational settling of the entrainment above the feed entry, the vapor velocity in the channel should not exceed the allowable settling velocity based upon the internal diameter of the annular entry. In the ordinary tower design the internal diameter of the annular channel is less than the diameter of the tower section above it, as the tower is of uniform diameter throughout, and hence all of the available tower area above the tangential entry is not used effectively. For example, in a conventional tower with an inside diameter of 21 feet and an annular channel internal diameter of 17 feet, the effective area based upon the inside diameter of the annular channel is 34.5 percent less than the total tower area based upon the diameter of the tower. My invention eliminates the sudden enlargement in the tower so that the full area of the tower above the feed entry is available for vapor flow. Hence, a quiescent state of vapor flow is achieved more quickly in my invention.

The apparatus and method of my invention will be further illustrated by reference to the accompanying drawing.

FIGURE 1 is a schematic drawing of the novel flash vaporization tower and its use for the separation of reduced petroleum crudes into gas oil and asphalt.

FIGURE 2 is a drawing of the tower at a section taken at 2—2 through the tower of FIGURE 1.

In the drawing, a reduced petroleum crude is introduced by lines 1 and 2 into heaters 3 and 4 respectively. The heated crude is removed by lines 5 and 6 to flash vaporization tower 7. The tower 7 is constructed of a lower shell 8 of larger diameter than the upper shell 9. A tangential annular channel 10 is formed by overlapping of the lower and upper shells 8 and 9. The design of the annular channel is determined as in the conventional type of tangential entry. The height and the width of the channel are determined by the peripheral velocity desired. The pressure drop through the channel should not be too high because this will cause the vapors to flow under the lip of the channel before they travel any substantial distance around the tower.

The preheated feed from lines 5 and 6 enter the annular channel 10 through lines 11 and 12 designed to introduce the feed tangentially into the channel. The vapor-liquid phase flows around the annular channel 10 and under the lip of the channel up into the upper shell 9 of the tower 7 where disengaging takes place in the disengaging space between the lip of the channel and the cycle oil draw off line 18. The upper shell 9 is of a height equal to at least one half of its diameter to provide adequate disengaging space. Vacuum is maintained in the tower by jet ejectors 13 and 14. Gas oil is removed from the tower by lines 15 and 16. Recycle is provided to the tower by line 17. Cycle oil is removed by line 18 and asphalt bottoms by line 19.

The operating efficiency of the novel tower in separating a reduced petroleum crude into gas oil and asphalt may be illustrated by comparison with a tower using a conventional type tangential feed entry. The entrainment in the conventional type entry tower, when operating on a temperature, pressure and feed rate corresponding to a "C" factor of 0.100, amounts to about 0.004 barrel per barrel of overhead and, at a "C" factor of .070, entrainment amounts to about 0.001 barrel of asphalt per barrel of overhead. With the tower of my invention, operating at a "C" factor of .100, entrainment is only about 0.0007 barrel of asphalt per barrel of overhead, and when the "C" factor is .070, entrainment is negligible. The tower can operate as high as a "C" factor of .125 before 0.004 barrel of asphalt per barrel of overhead are entrained, representing a 25 percent increase in capacity of the tower.

My invention, therefore, provides greatly increased tower capacity at equivalent separation or better separation at equivalent capacity. It eliminates the sudden enlargement in flow area above the lip of the annular channel which eliminates eddies and toroidal currents accompanying a sudden enlargement in flow area. Hence, more even and uniform flow of vapor is obtained above annular channel lip which gives better entrainment settling since eddy currents are not present to re-entrain and remix entrainment. Moreover, all of the tower area above the annular channel is useful for vapor flow.

This application is a continuation-in-part of my copending application Serial No. 360,643, filed June 10, 1953.

I claim:

1. A flash vaporization apparatus which comprises heating means and a vertical metal shell having two parts disposed in concentric vertical alignment, the lower part having a closure in its lower section having means for removing liquid products from the shell, said lower part having a diameter greater than the diameter of the upper part, said upper part having a lower open end and a lower section with its vertical wall extending into said lower part, said heating means providing a heated mixed liquid-vapor phase feed, and being connected by a conduit to means at said lower part for injecting said heated mixed liquid-vapor phase feed tangentially into an annular channel formed by the inside of said lower part and the outside of said extending wall, said annular channel being open at the bottom and closed at the top, whereby only vapors and liquids entrained thereby are passed into said upper part, said upper part having a first means for withdrawing condensed liquid at a height above the lower open end of said upper part equal to at least about one-half the diameter of said lower part, the space between said first means for withdrawing condensed liquid and said lower open end providing a liquid-vapor disengaging space, the upper section of said upper part having a closure with a conduct connected to means for creating reduced pressure in the shell by removing vapor products from the shell, said upper section having between said closure and said first means for withdrawing condensed liquid a second means for removal of condensed liquid from the shell.

2. The flash vaporization apparatus of claim 1 wherein there is provided means for introducing liquid to the upper part of said flash vaporization shell above said second means for withdrawing condensed liquid connected by a conduit to said second means.

References Cited in the file of this patent

UNITED STATES PATENTS

| | | |
|---|---|---|
| 1,620,163 | Milliff | Mar. 8, 1927 |
| 2,357,829 | Ittner | Sept. 12, 1944 |
| 2,425,661 | Weber et al. | Aug. 12, 1947 |
| 2,539,264 | Murray | Jan. 23, 1951 |
| 2,543,001 | Dean | Feb. 27, 1951 |
| 2,796,389 | Spijker | June 18, 1957 |
| 2,816,490 | Broadway et al. | Dec. 17, 1957 |

UNITED STATES PATENT OFFICE
CERTIFICATE OF CORRECTION

Patent No. 3,080,300             March 5, 1963

Reading Barlow Smith

It is hereby certified that error appears in the above numbered patent requiring correction and that the said Letters Patent should read as corrected below.

Column 2, line 58, for "dorplets" read -- droplets --; column 6, line 13, for "conduct" read -- conduit --.

Signed and sealed this 9th day of June 1964.

(SEAL)
Attest:

ERNEST W. SWIDER
Attesting Officer

EDWARD J. BRENNER
Commissioner of Patents